(12) United States Patent
Medagoda et al.

(10) Patent No.: US 10,239,555 B2
(45) Date of Patent: Mar. 26, 2019

(54) SINGLE-MODE IMPLEMENT STEERING

(71) Applicant: AGJUNCTION LLC, Hiawatha, KS (US)

(72) Inventors: Eran D. B. Medagoda, Morningside (AU); Timothy J. Sullivan, Kedron (AU); Brendan M. Joiner, Bald Hills (AU); Andreas F. Ramm, Woolloongabba (AU); Tri M. Dang, Durack (AU)

(73) Assignee: AGJUNCTION LLC, Hiawatha, KS (US)

(*) Notice: Subject to any disclaimer, the term of this patent is extended or adjusted under 35 U.S.C. 154(b) by 193 days.

(21) Appl. No.: 15/345,792

(22) Filed: Nov. 8, 2016

(65) Prior Publication Data
US 2017/0144701 A1 May 25, 2017

Related U.S. Application Data

(60) Provisional application No. 62/257,396, filed on Nov. 19, 2015.

(51) Int. Cl.
B62D 6/00 (2006.01)
B62D 15/02 (2006.01)
A01B 69/00 (2006.01)

(52) U.S. Cl.
CPC .............. B62D 6/00 (2013.01); A01B 69/004 (2013.01); B62D 15/025 (2013.01)

(58) Field of Classification Search
CPC . B62D 6/00; B62D 6/10; B62D 13/04; B62D 6/007; B62D 6/003; B62D 59/02; B62D 15/023; B62D 15/028; B62D 15/021; B62D 15/02; B62D 6/001; G05D 1/0272; G05D 1/0242; G05D 1/0202; G05D 1/0246; G05D 1/0274; G05D 2201/02; G05D 1/0257; G05D 1/0088
See application file for complete search history.

(56) References Cited

U.S. PATENT DOCUMENTS

| 5,194,851 A | 3/1993 | Kraning et al. |
| 5,390,125 A | 2/1995 | Sennott et al. |
| 5,663,879 A | 9/1997 | Trovato et al. |
| 5,923,270 A | 7/1999 | Sampo et al. |

(Continued)

OTHER PUBLICATIONS

Noh, Kwang-Mo, Self-tuning controller for farm tractor guidance, Iowa State University Retrospective Theses and Dissertations, Paper 9874, (1990).

(Continued)

Primary Examiner — Courtney D Heinle
Assistant Examiner — Luis A Martinez Borrero
(74) Attorney, Agent, or Firm — Schwabe Williamson & Wyatt

(57) ABSTRACT

A guidance system identifies a path on a field and then calculates a position and heading of a trailer relative to the path. The guidance system steers a vehicle connected to the trailer based on the calculated trailer position and heading to minimize the trailer positional error and more quickly and accurately align the trailer with the path. The guidance system may align the trailer with the path while steering the vehicle in a reverse direction and may steer the vehicle based on a predicted trailer position and heading.

9 Claims, 9 Drawing Sheets

DUAL-MODE IMPLEMENT STEERING

(56) References Cited

U.S. PATENT DOCUMENTS

| | | |
|---|---|---|
| 6,052,647 A | 4/2000 | Parkinson et al. |
| 6,070,673 A | 6/2000 | Wendte |
| 6,212,453 B1 | 4/2001 | Kawagoe et al. |
| 6,373,432 B1 | 4/2002 | Rabinowitz et al. |
| 6,377,889 B1 | 4/2002 | Soest |
| 6,445,983 B1 | 9/2002 | Dickson et al. |
| 6,539,303 B2 | 3/2003 | McClure et al. |
| 6,711,501 B2 | 3/2004 | McClure et al. |
| 6,789,014 B1 | 9/2004 | Rekow et al. |
| 6,819,780 B2 | 11/2004 | Benson et al. |
| 6,865,465 B2 | 3/2005 | McClure |
| 6,876,920 B1 | 4/2005 | Mailer |
| 7,142,956 B2 | 11/2006 | Heiniger et al. |
| 7,162,348 B2 | 1/2007 | McClure et al. |
| 7,277,792 B2 | 10/2007 | Overschie |
| 7,373,231 B2 | 5/2008 | McClure et al. |
| 7,400,956 B1 | 7/2008 | Feller et al. |
| 7,437,230 B2 | 10/2008 | McClure |
| 7,460,942 B2 | 12/2008 | Mailer |
| 7,580,783 B2 * | 8/2009 | Dix .................... G01C 21/005 342/357.36 |
| 7,689,354 B2 | 3/2010 | Heiniger et al. |
| RE41,358 E | 5/2010 | Heiniger et al. |
| 7,835,832 B2 | 11/2010 | Macdonald et al. |
| 7,885,745 B2 | 2/2011 | McClure et al. |
| 7,904,226 B2 * | 3/2011 | Dix .................... G01C 21/005 172/3 |
| 8,018,376 B2 | 9/2011 | McClure et al. |
| 8,190,337 B2 | 5/2012 | McClure |
| 8,214,111 B2 | 7/2012 | Heiniger et al. |
| 8,311,696 B2 | 11/2012 | Reeve |
| 8,386,129 B2 | 2/2013 | Collins et al. |
| 8,401,704 B2 | 3/2013 | Pollock et al. |
| 8,489,291 B2 | 7/2013 | Dearborn et al. |
| 8,521,372 B2 | 8/2013 | Hunt et al. |
| 8,548,649 B2 | 10/2013 | Guyette et al. |
| 8,583,315 B2 | 11/2013 | Whitehead et al. |
| 8,583,326 B2 | 11/2013 | Collins et al. |
| 8,589,013 B2 | 11/2013 | Pieper et al. |
| 8,594,879 B2 | 11/2013 | Roberge et al. |
| 8,634,993 B2 | 1/2014 | McClure et al. |
| 8,639,416 B2 * | 1/2014 | Jones .................... A01B 69/007 342/357.22 |
| 8,649,930 B2 | 2/2014 | Reeve et al. |
| 8,676,620 B2 | 3/2014 | Hunt et al. |
| 8,718,874 B2 | 5/2014 | McClure et al. |
| 8,768,558 B2 | 7/2014 | Reeve et al. |
| 8,781,685 B2 | 7/2014 | McClure |
| 8,803,735 B2 | 8/2014 | McClure |
| 8,897,973 B2 | 11/2014 | Hunt et al. |
| 8,924,152 B2 | 12/2014 | Hunt et al. |
| 9,002,565 B2 | 4/2015 | Jones et al. |
| 9,002,566 B2 | 4/2015 | McClure et al. |
| 9,141,111 B2 | 9/2015 | Webber et al. |
| 9,162,703 B2 | 10/2015 | Miller et al. |
| 9,173,337 B2 | 11/2015 | Guyette et al. |
| 9,223,314 B2 | 12/2015 | McClure et al. |
| 9,255,992 B2 | 2/2016 | McClure |
| 9,389,615 B2 | 7/2016 | Webber et al. |
| 2002/0072850 A1 | 6/2002 | McClure et al. |
| 2002/0072851 A1 * | 6/2002 | Ahearn ................ A01B 69/007 701/483 |
| 2004/0186644 A1 | 9/2004 | McClure et al. |
| 2006/0142936 A1 * | 6/2006 | Dix .................... G01C 21/005 701/50 |
| 2006/0167600 A1 | 7/2006 | Nelson, Jr. et al. |
| 2008/0167770 A1 * | 7/2008 | Macdonald .......... A01B 69/008 701/24 |
| 2008/0275602 A1 * | 11/2008 | Peake .................. G05D 1/0212 701/25 |
| 2009/0276127 A1 * | 11/2009 | Dix .................... G01C 21/005 701/50 |
| 2010/0017075 A1 * | 1/2010 | Beaujot ................ A01B 69/008 701/50 |
| 2010/0084147 A1 * | 4/2010 | Aral .................... A01B 69/004 172/1 |
| 2010/0274452 A1 | 10/2010 | Ringwald et al. |
| 2010/0312428 A1 * | 12/2010 | Roberge ............... A01B 69/007 701/23 |
| 2011/0054729 A1 * | 3/2011 | Whitehead ........... A01B 69/007 701/31.4 |
| 2012/0174445 A1 * | 7/2012 | Jones .................... A01B 69/007 37/197 |
| 2012/0215410 A1 * | 8/2012 | McClure ............. A01B 79/005 701/50 |
| 2012/0283909 A1 * | 11/2012 | Dix .................... B60D 1/36 701/41 |
| 2012/0296529 A1 | 11/2012 | Peake |
| 2013/0041549 A1 * | 2/2013 | Reeve .................. B62D 15/025 701/28 |
| 2014/0266877 A1 | 9/2014 | McClure |
| 2014/0277676 A1 | 9/2014 | Gattis |
| 2014/0324291 A1 * | 10/2014 | Jones .................... E02F 9/2045 701/41 |
| 2015/0175194 A1 | 6/2015 | Gattis |
| 2016/0039454 A1 | 2/2016 | Mortimer |
| 2016/0154108 A1 | 6/2016 | McClure et al. |
| 2016/0205864 A1 | 7/2016 | Gattis et al. |
| 2016/0214643 A1 | 7/2016 | Joughin et al. |
| 2016/0252909 A1 | 9/2016 | Webber et al. |
| 2016/0334804 A1 | 11/2016 | Webber et al. |
| 2017/0147005 A1 * | 5/2017 | Ramm ................ G05D 1/0295 |

OTHER PUBLICATIONS

Van Zuydam,. R.P., Centimeter-Precision Guidante of Agricultural Impleet ns in the Open Field by Means of Real Tim Kinematic DGPS, ASA-CSSA-SSSA, pp. 1023-1034 (1999).

\* cited by examiner

DUAL-MODE IMPLEMENT STEERING

SINGLE-MODE IMPLEMENT STEERING

SINGLE-MODE STEERING APPLIED TO CURVED PATH

VEHICLE/TRAILER MODEL (GEOMETRY)

VEHICLE/TRAILER MODEL (STATES)

VIRTUAL IMPLEMENT SYSTEM

MEASURED IMPLEMENT SYSTEM

SINGLE-MODE IMPLEMENT STEERING

The present application claims priority to U.S. Provisional Patent Application Ser. No. 62/257,396 filed on Nov. 19, 2015, entitled: PASSIVE, CLOSED-LOOP, SINGLE-MODE IMPLEMENT STEERING which is incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to passive, closed-loop, single-mode implement steering.

BACKGROUND

A steering controller may autonomously steer a vehicle along predefined paths or rows in a field. The paths or rows are alternatively referred to as way lines or AB lines and the guidance system may steer vehicles used for any type of operation including planting, fertilizing, grading, harvesting, etc. The guidance system tries to accurately steer the vehicle over the intended path. Any errors or delays steering the vehicle over the correct path may cause the vehicle to apply materials, such as seed and/or fertilizer, in wrong or suboptimal locations reducing yields and increasing waste.

The vehicle is often attached to an implement that performs agricultural tasks. Many of these implements can be classified as hitched, trailing implements that are pulled by the vehicle and are free to rotate about a hitch point. Unfortunately, the path taken by the vehicle is not always the same path taken by the implement and the steering controller while steering the vehicle over a desired path (by minimizing positional error) may not accurately track the implement over the same path.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

A vehicle guidance system steers a vehicle so a towed implement more quickly and accurately tracks a desired path. Instead of first aligning the vehicle over the path, the vehicle guidance system first aligns the implement over the path by minimizing implement positional error relative to the path. In one example, the guidance system uses a passive closed-loop single-mode implement steering scheme rather than first switching between a vehicle steering control mode and a second implement steering control mode.

The single-mode steering scheme may use both the implement and vehicle positions and orientations relative to the path. The guidance system may obtain the implement position and orientation using two different methods. A first method places sensors on the implement itself (GPS and inertial sensors) and compares their relative positions and orientations to the vehicle. The vehicle is also fitted with sensors to monitor its own position and orientation. The second method predicts implement position and orientation based on known vehicle states and implement geometries.

Single-mode steering may manage implement errors from engagement, regardless of the current position of the implement relative to a way line. This is different from alternative implement steering strategies such as dual-mode steering where a steering controller initially places the vehicle online. The dual-mode steering controller then waits for the implement to naturally converge onto the way line, generally a time consuming process, depending on the length and configuration of the implement. Once the implement has neared the desired path within a suitable threshold (typically an implement cross-track error threshold), the controller then switches to a separate implement steering controller to make the final correction and manage small variations in implement position. Acquisition performance of dual-mode steering is slow, and may consume a significant amount of time and distance along the desired path before starting implement control.

Figure 1:
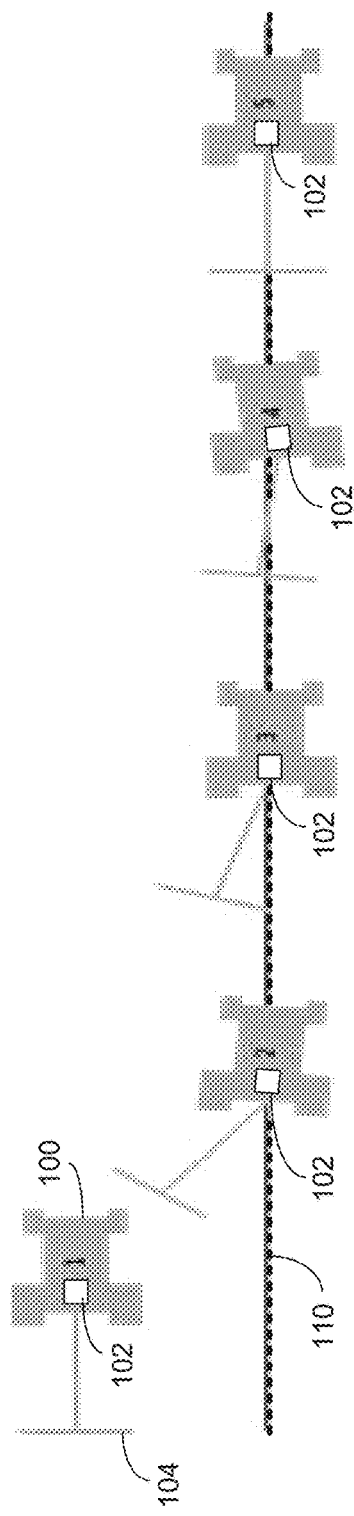
FIG. 1 shows an example of dual-mode implement steering.

FIG. 1 illustrates the principles behind dual-mode implement steering. Initially in stage 1, vehicle 100 and implement 104 are offset from a desired path 110. A dual-mode controller 102 engages and steers vehicle 100 onto line 110 until acquisition is completed at stage 2. At stage 3, vehicle 100 is in-line with path 110; however, implement 104 has not yet reduced a position error relative to path 110 enough for initiating a second implement steering mode.

Once implement 104 finally reaches a desired position error threshold, the dual-mode controller 102 switches into a second implement steering mode, forcing vehicle 100 to perform a final correction maneuver in stage 4 to eventually place implement 104 in-line with path 110 in stage 5. For example, during the second steering mode, controller 102 may start reading position signals from a GPS receiver on implement 104 to determine a distance of implement 104 from path 110 and steer vehicle 100 to reduce the position error of implement 104 with path 110.

Figure 2:
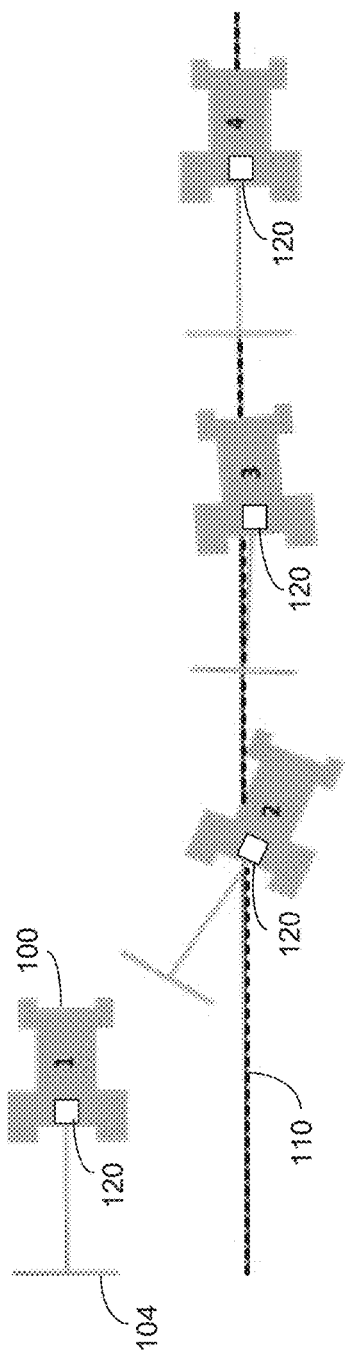
FIG. 2 shows an example of a single-mode implement steering.

FIG. 2 shows how a single-mode implement steering scheme places implement 104 onto desired path 110 quicker and more accurately than the dual-mode acquisition scheme in FIG. 1. Initially at stage 1, vehicle 100 and implement 104 are offset from desired path 110. A single-mode guidance system 120 is engaged at stage 1 and immediately starts steering vehicle 100 so that implement 104, instead of vehicle 100, first aligns with path 110. In other words, instead of initially reducing the position offset of vehicle 100, guidance system 120 immediately starts steering vehicle 100 through stages 2 and 3 to reduce a positional offset of implement 104 relative to path 110.

During stages 2 and 3, guidance system 120 may intentionally cause vehicle 100 to overshoot path 110 aggressively bringing implement 104 in-line with path 110. This is in contrary to the dual-mode steering in FIG. 1, which waits for vehicle 100 to first converge with path 110 before then aligning implement 104 with path 110. The aggressive attack angle taken by vehicle 100 while traveling toward and over path 110 more quickly aligns implement 104 and vehicle 100 with path 110 at stage 4 and uses fewer steering stages than the dual-mode steering shown in FIG. 1.

Figure 3:
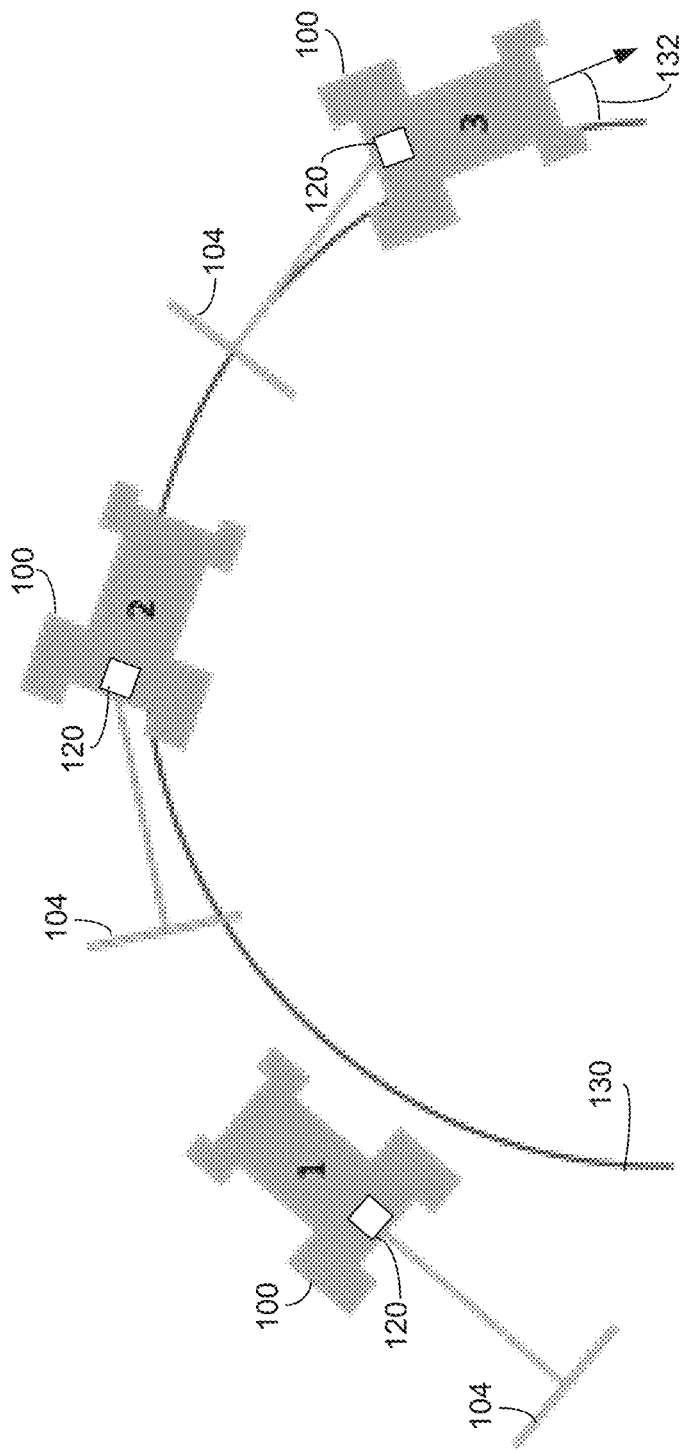
FIG. 3 shows an example of a single-mode implement steering on a curved path.

FIG. 3 shows how the single-mode steering scheme more quickly and accurately tracks an implement along a circular or curved path 130. At stage 1 vehicle 100 and implement 104 are again offset from curved path 130. In state 2, guidance system 120 engages and steers vehicle 100 to reduce a positional error of implement 104 relative to path 130. Similar to the straight path in FIG. 2, guidance system 120 may cause vehicle 100 to overshoot path 130 to more quickly reduce the positional error of implement 104 relative to path 130.

Guidance system 120 detects or predicates implement 104 aligned over curved path 130 in stage 3. For example, the guidance system 120 may receive GPS signals from a GPS receiver (not shown) mounted on implement 104 or may calculate a predicted position of implement 104 based on vehicle and implement parameters as described in more detail below. After aligning implement 104 with curved path 130, guidance system 120 holds vehicle 100 in a steady turn radius so implement 104 remains in a same aligned position with curved path 130.

Guidance system 120 may maintain a position and heading offset 132 between vehicle 100 and curved path 130 to keep implement 104 in-line with curved path 130. Offset 132 could be problematic for dual-mode controllers that first place vehicle 100 in-line with path 130 in a first mode before waiting for implement 104 to converge with path 130 in the second mode. If a steady-state position of implement 100 is outside a switching threshold, the dual-mode controller may remain fixed in the first vehicle alignment mode and never switch to the second implement alignment mode.

Figure 4:
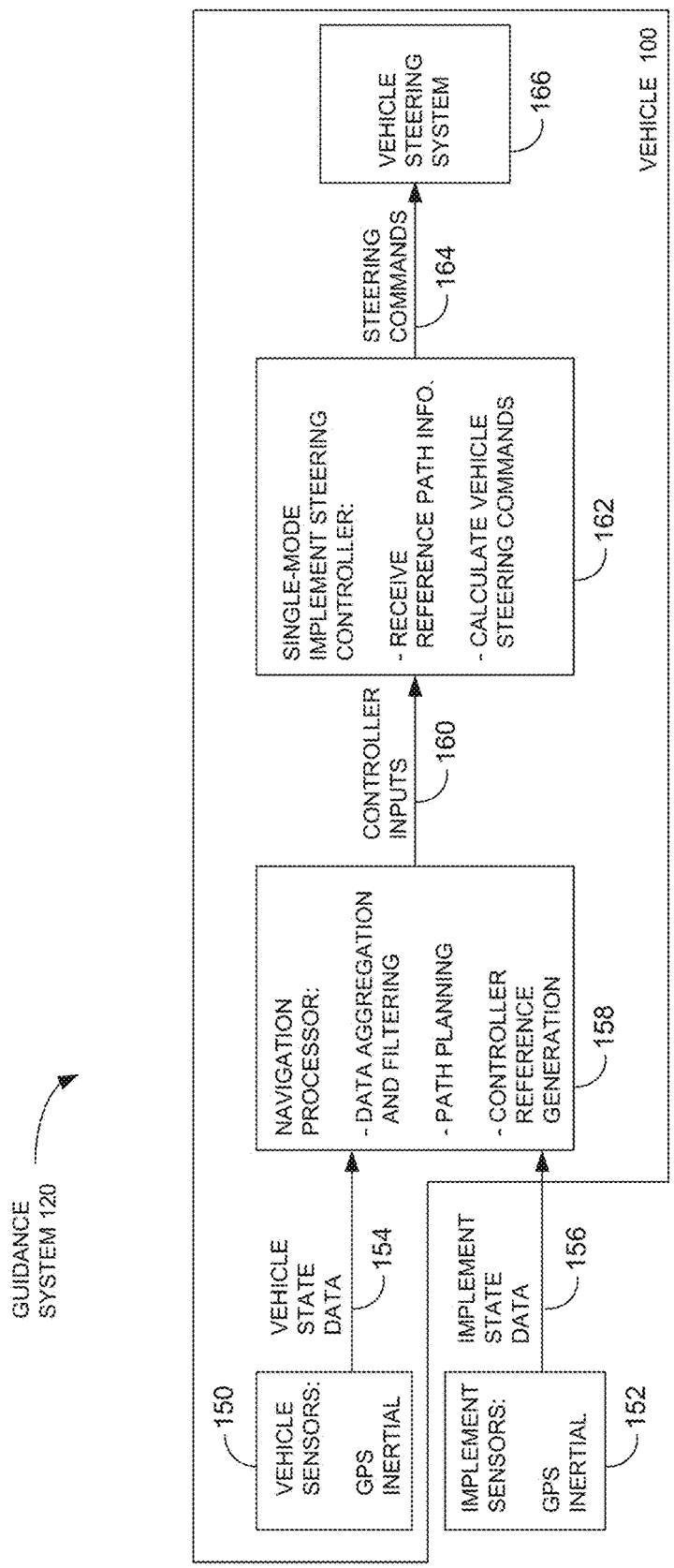
FIG. 4 shows an example guidance system that calculates steering commands for executing single-mode implement steering.

FIG. 4 shows in more detail the guidance system that controls automated passive, closed-loop, single-mode implement steering. Referring to FIGS. 1-4 and more specifically to FIG. 4, vehicle sensors 150 are located on vehicle 100 and may generate vehicle state data 154, and implement sensors 152 are located on implement 104 and may generate implement state data 156.

For example, vehicle sensors 150 and implement sensors 152 may include any combination of global positioning system (GPS) receivers and inertial sensors, such as gyroscopes and accelerometers. Vehicle sensors 150 may generate any combination of navigation signals that identify a state of vehicle 100, such as latitudinal and longitudinal positions, heading, speed, steering angle, pitch, roll, yaw, etc. Implement sensors 152 generate similar state information for implement 104.

A navigation processor 158 may aggregate vehicle state data 154 and implement state data 156 to derive position and heading data and other navigation information for vehicle 100 and implement 104. Navigation processor 158 also may include a computer with a computer screen that a user accesses to perform path planning such as inputting a desired set of way lines defining a path over a field.

A single-mode implement steering controller 162 receives the reference path, positional data for vehicle 100 and positional data for implement 104 from navigation processor 158. Controller 162 calculates error/distances of vehicle 100 and implement 104 relative to path 110. For example, controller 162 may calculate a vehicle heading error, an implement heading error, and an implement cross-track error relative to the stored path entered by the user.

Controller 162 generates steering commands 164 based on the derived vehicle and implement error values. Steering commands 164 are sent to a vehicle steering system 166 that steer vehicle 100 according to the single-mode tracking scheme to more quickly and accurately align implement 104 onto the target path as described above in FIGS. 2 and 3.

In one example, controller 162 may perform single-mode implement steering using only vehicle state data 154 from vehicle sensors 150. In this example, controller 162 may use predicted error values for implement 104.

In one example, navigation processor 158 and single-mode implement steering controller 162 are functional delineations within guidance system 120. For example, the same or different processing devices in guidance system 120 may perform any combination of operations in navigation processor 158 and steering controller 162. For example, a first set of software executed in one or more processing devices located on vehicle 100 may implement navigation processor 158 and a second set of software executed by the same or different combination of processing devices may use single-mode controller 162.

Kinematic Vehicle/Trailer Model

Figure 5:
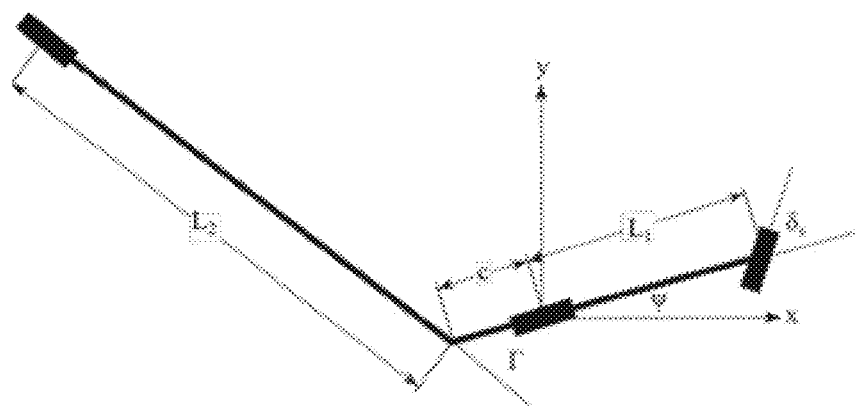
FIGS. 5 and 6 shows vehicle/trailer models.
Figure 6:
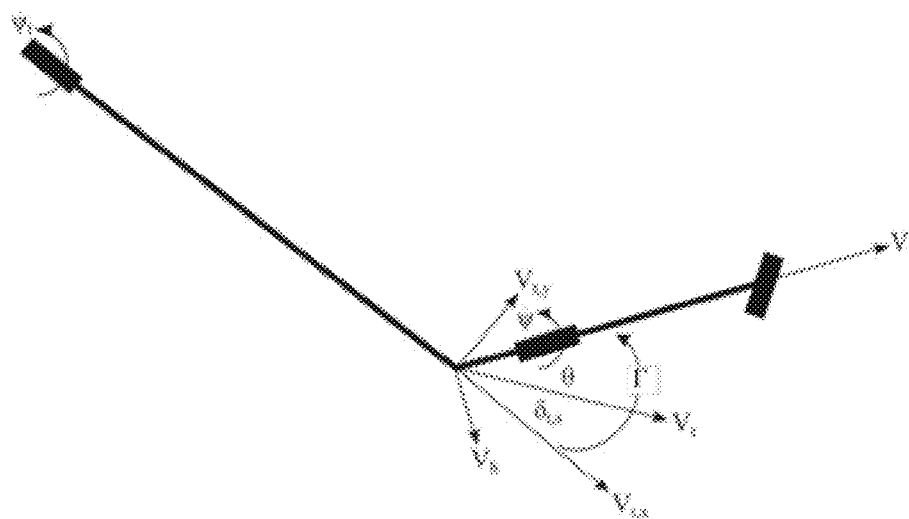

FIG. 5 shows a vehicle/trailer model (geometry) and FIG. 6 shows a vehicle/trailer model (states). Implement 104 in FIGS. 1-3 is alternatively referred to below as a trailer. Kinematic models may only use spatial and geometric properties to describe the motion of a system, and may not consider causal forces such as friction and weight to explain those behaviors. Kinematic models may provide an idealized view of the motion and interactions between components within the system, and generally provide good representations of system dynamics.

FIGS. 5 and 6 illustrate the geometric representation of a vehicle-implement system. In this system, $L_1$ denotes vehicle wheelbase, $L_2$ the trailer length, and c represents a hitch length of the vehicle behind a control point. In this model, it is assumed that the vehicle control point is at the center of the rear axle. The equations of motion that govern this system are as follows:

$$\dot{x} = V\cos(\psi_v) \qquad (2.1)$$

$$\dot{y} = V\sin(\psi_v) \qquad (2.2)$$

$$\dot{\psi}_v = \frac{V}{L_1}\tan(\delta_S) \qquad (2.3)$$

$$\dot{\psi}_t = \frac{V_t}{L_2}\sin(\psi_v - \psi_t - \theta) \qquad (2.4)$$

$$\Gamma = \psi_v - \psi_t \qquad (2.5)$$

$$x_t = x - c\cos(\psi_v) - L_2\cos(\psi_t) \qquad (2.6)$$

$$y_t = y - c\sin(\psi_v) - L_2\sin(\psi_t) \qquad (2.7)$$

where $$\theta = \tan^{-1}\left(\frac{c\tan(\delta_S)}{L_1}\right) \qquad (2.8)$$

$$V_t = V\sec(\theta) \qquad (2.9)$$

For this system, the terms x and y represent the position of the vehicle control point in the local frame, $\psi_v$ represents the heading of the vehicle, $\psi_t$ represents the trailer heading, $\Gamma$ represents the articulation angle of the vehicle (the heading difference between the vehicle and trailer), and $x_t$ and $y_t$ represent the position of the trailer in the local frame. The terms V and $\delta_s$ represent the speed and steering angles of the vehicle respectively, and are the system control inputs.

One difference between a vehicle and vehicle/trailer system is the additional states for trailer heading $\psi_t$, articulation angle $\Gamma$, and trailer position $x_t$ and $y_t$. The behavior of the trailer when the system is in motion is characterized by these states, and is influenced by the trailer geometry.

System Linearization

From a control perspective, the states to be managed when controlling the vehicle/trailer system are vehicle heading, trailer heading, and trailer cross-tracker error. The parameters are therefore linearized about these states so a suitable plant can be formulated to form the basis of the controller design. To do so, non-linear definitions are determined for vehicle and trailer heading rates:

$$\dot{\psi}_v = V\kappa_v \qquad (2.10)$$

$$\dot{\psi}_t = \frac{V_t}{L_2}\sin(\psi_v - \psi_t - \theta) \qquad (2.11)$$

where $$\kappa_v = \frac{\tan(\delta_S)}{L_1} \qquad (2.12)$$

$$\theta = \tan^{-1}(c\kappa_v) \qquad (2.13)$$

$$V_t = V\sec(\theta) \qquad (2.14)$$

Applying small angle approximations to Equations 2.10 to 2.14 results in the following linearized system:

$$\dot{\psi}_v = V\kappa_v \qquad (2.15)$$

$$\dot{\psi}_t = \frac{V}{L_2}(\psi_v - \psi_t - c\kappa_v) \qquad (2.16)$$

In the design of the single-mode controller, it is more applicable to represent the relevant vehicle and trailer states as functions of error states as the controller may act as a regulator (reference of zero). Consequently, the system can be expressed as:

$$e_{\dot{\psi}_v} = Ve_{\kappa_v} \qquad (2.17)$$

$$e_{\dot{\psi}_t} = \frac{Ve_{\psi_v}}{L_2} - \frac{Ve_{\psi_t}}{L_2} - \frac{eVc_{\kappa_v}}{L_2} \qquad (2.18)$$

$$e_{\dot{c}t_t} = Vc_{\psi_t} \qquad (2.19)$$

where $e_{\psi_v}$ denotes vehicle heading error, $e_{\psi_t}$ is trailer heading error, $e_{ct_t}$ is trailer cross-track, and $e_{k_v}$ is vehicle curvature error.

Heading errors refer to the difference in heading between the vehicle and trailer relative to the desired path. If the vehicle or trailer is travelling parallel with the desired path, their respective heading errors will be zero. Cross-track error refers to the lateral position offset of the trailer to the desired path. If the trailer is either left or right of the path, the cross-track will be non-zero. The trailer is travelling on-line when both the heading errors and cross-track errors are zeros. Vehicle curvature error is the amount of curvature demand applied by the vehicle to steer the vehicle onto the desired path.

In state-space form, the system can be expressed as:

$$\begin{bmatrix} e_{\dot{\psi}_v} \\ e_{\dot{\psi}_t} \\ e_{\dot{c}t_t} \end{bmatrix} = \begin{bmatrix} 0 & 0 & 0 \\ \frac{V}{L_2} & -\frac{V}{L_2} & 0 \\ 0 & V & 0 \end{bmatrix} \begin{bmatrix} e_{\psi_v} \\ e_{\psi_t} \\ e_{ct_t} \end{bmatrix} + \begin{bmatrix} V \\ -\frac{eV}{L_2} \\ 0 \end{bmatrix} e_{\kappa_v} \qquad (2.20)$$

which is in the linear state-space form:

$$\dot{x} = Ax + Bu \qquad (2.21)$$

Controller Gains

When designing controllers using the pole-placement technique, a desired characteristic equation is defined. The following closed-loop characteristic equation was one example selected for the system described in Equation 2.20.

$$\Phi_D(s) = (s+\omega_l)(s^2 + 2\zeta\omega_h s + \omega_h^2) \qquad (2.22)$$

here $\omega_h$ and $\omega_l$ define the desired high and low frequencies pole locations, with $\zeta$ defining the damping factor. The desired characteristic equation is third order to accommodate the three states in the system to be controlled. Expanding the expression and grouping the polynomial into coefficients of s yields:

$$\Phi_D(s) = s^3 + (2\zeta\omega_h + \omega_l)s^2 + (\omega_h^2 + 2\zeta\omega_h\omega_l)s + \omega_h^2\omega_l \qquad (2.23)$$

In state-space, the desired controller can be expressed as:

$$\vec{u} = K\vec{x} \qquad (2.24)$$

where $$\vec{K} = [K_1 K_2 K_2]^T \qquad (2.25)$$

represents a vector of controller gains acting on the system states expressed in Equation 2.20. Substituting Equation 2.24, the closed-loop system can be expressed as:

$$\dot{\tilde{x}} = [A + B\tilde{K}]\tilde{x} \qquad (2.26)$$

The closed-loop characteristic equation for this system can be found by calculating the determinant of the following transfer function realization:

$$\Phi_{cl}(s) = |[sI - (A + B\tilde{K})]^{-1}| \qquad (2.27)$$

As a result, the closed-loop characteristic equation expressed in coefficients of s is:

$$\Phi_{cl}(s) = a_0 s^3 + a_1 s^2 + a_2 s + a_3 \quad (2.28)$$

where $$a_0 = 1 \quad (2.29)$$

$$a_1 = VK_1 - \frac{cV}{L_2}K_2 + \frac{V}{L_2} \quad (2.30)$$

$$a_2 = \frac{V^2}{L_2}K_1 - \frac{V^2}{L_2}K_2 - \frac{cV^2}{L_2}K_3 \quad (2.31)$$

$$a_3 = \frac{V^3}{L_2}K_3 \quad (2.32)$$

By equating the coefficients $a_0$ to $a_3$ with the coefficients of s in Equation 2.23, it is possible to evaluate the controller gains in K as a function of desired closed-loop pole locations and system geometries. Expressed in matrix form, the coefficients can be equated to:

$$\begin{bmatrix} V & -\frac{cV}{L_2} & 0 \\ \frac{V^2}{L_2} & \frac{V^2}{L_2} & -\frac{cV^2}{L_2} \\ 0 & 0 & \frac{V^3}{L_2} \end{bmatrix} \begin{bmatrix} K_1 \\ K_2 \\ K_3 \end{bmatrix} = \begin{bmatrix} 2\zeta\omega_h + \omega_l - \frac{V}{L_2} \\ \omega_h^2 + 2\zeta\omega_h\omega_l \\ \omega_h^2 \omega_l \end{bmatrix} \quad (2.33)$$

Solving Equation 2.33 yields:

$$K_1 = \frac{2\zeta\omega_h + \omega_l - \frac{V}{L_2} + \frac{cVK_2}{L_2}}{V} \quad (2.34)$$

$$K_2 = \frac{\omega_h^2 + 2\zeta\omega_h\omega_l + \frac{c\omega_h^2\omega_l}{V} - \frac{V}{L_2}\left(2\zeta\omega_h + \omega_l - \frac{V}{L_2}\right)}{\frac{V^2}{L_2}\left(1 + \frac{c}{L_2}\right)} \quad (2.35)$$

$$K_3 = \frac{L_2 \omega_h^2 \omega_l}{V^3} \quad (2.36)$$

which are the gains acting on the system states to formulate the control input u (Equation 2.24), which in this case is the vehicle curvature error $e_{K_v}$.

The single-mode implement steering controller is driven by three error states—vehicle heading error $e_{\psi_v}$, trailer heading error $e_{\psi_t}$, and trailer cross-track error $e_{ct_t}$. Management of these error states allows for the formulation of the demanded vehicle curvature for the system, expressed generally as:

$$e_{K_v} = [K_1 K_2 K_3]\begin{bmatrix} e_{\psi_v} \\ e_{\psi_t} \\ e_{ct_t} \end{bmatrix} + K_{int}\int e_{ct_t} dt \quad (2.37)$$

where $e_{K_v}$ is the demanded vehicle curvature error used for steering the vehicle.

The terms $K_1$, $K_2$, $K_3$, expressed in Equations 2.34, 2.35 and 2.36, define the evaluated controller terms. They are calculated to manage each respective error state, and are automatically adjusted based on vehicle speed to maintain consistent implement acquisition and online performance across the operational speed range. The term $K_{int}$ is an integral term that acts to minimize steady-state implement cross-track error.

Constraint Management

A consideration when controlling a vehicle/trailer system is managing constraints, namely, the articulation angle between the vehicle and trailer. As the vehicle maneuvers, the trailer pivots about the hitch point, altering the angle it makes with the vehicle. If the vehicle happens to steer too aggressively, the potential exists for the trailer angle to increase to a point that the system jackknifes, causing the trailer to collide with the vehicle.

To prevent this scenario, the single-mode controller monitors the articulation angle Γ, where the rate calculation is described in Equation 2.5. To ensure that the system does not jackknife, upper and lower limits for the articulation angle are obtained either through physical measurements or calibration such that:

$$\Gamma_{min} < \Gamma < \Gamma_{max} \quad (2.38)$$

where $\Gamma_{min}$ is the lower articulation angle limit and $\Gamma_{max}$ is the upper articulation angle limit. Any demanded vehicle curvature error generated by the controller, calculated in Equation 2.37, may use these limits for implement steering.

Control Applications

As explained above, passive, closed-loop, single-mode implement steering may use implement navigation states (position, speed, heading and yaw rate) for more efficiently locating an implement onto a path. The implement navigation states may be obtained using either a measured implement scheme or a virtual implement scheme.

Figure 7:
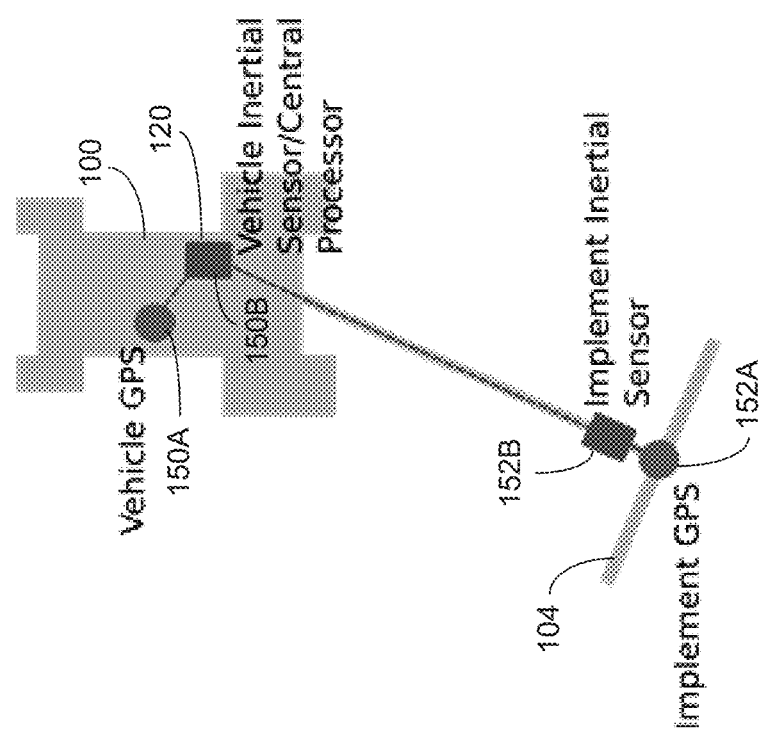
FIG. 7 shows an example system for measuring implement position.

FIG. 7 shows on example system that uses the measured implement scheme. Vehicle 100 may include the guidance system 120 described above for processing vehicle and implement navigation data and generating steering commands for steering vehicle 100. Guidance system 120 may include a central processor and vehicle inertial sensors 150B. A GPS receiver 150A also may be installed on vehicle 100. Inertial sensor 150B and GPS sensor 150A may generate the navigation states for vehicle 100 such as, position, speed, heading and yaw rate, etc.

An implement GPS receiver 152A and implement inertial sensors 152B are installed on implement 104. GPS receiver 152A and inertial sensors 152B may generate and send navigation states for implement 104 to guidance system 120 via wired or wireless connections.

Guidance system 120 uses the vehicle navigation data from GPS 150A and inertial sensor 150B and the implement navigation data from GPS 152A and inertial sensor 152B to generate a steering control solution using Equation 2.37. The formulated control solution is sent to vehicle steering system 166 in FIG. 4 to steer implement 104 onto the desired path as shown above in FIGS. 2 and 3.

One advantage of the measured implement scheme in FIG. 7 is that navigation states of implement 104 are measured directly, allowing accurate steering control while also managing disturbances. For example, the direct measurements from implement GPS sensor 152 and inertial sensor 152B allow guidance system 120 to compensate for ruts, rocks, or any other obstruction that may move implement 104 off of the target path. For example, guidance system 120 may adjust the steering commands via Equation 2.37 to more quickly move implement 140 back onto the target path. The measured implement scheme uses the implement navigation data to perform terrain compensation and disturbance management for high accuracy control on level and sloped terrain.

Figure 8:
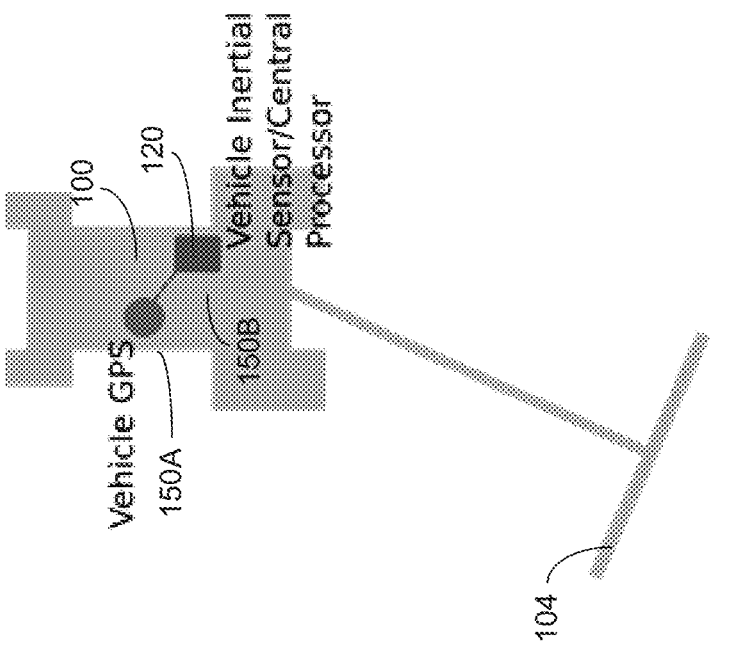
FIG. 8 shows an example system for predicting implement position.

FIG. 8 shows a virtual implement system for executing the virtual implement scheme. Inertial sensors 150 and GPS receiver 150B are still mounted on vehicle 100. However, implement GPS receiver 152A and implement inertial sensor 152B may no longer be mounted on implement 104. Implement 104 is considered virtual since a true implement position is not directly measured. Instead of directly measuring implement navigation states, guidance system 120 predicts the implement states. Guidance system 120 then uses the predicted implement states in 2.37 to calculate steering solutions for steering vehicle 100 so a virtual calculated position of implement 104 is located over the desired path.

In formulating an analytic solution for vehicle heading, begin with Equation 2.4:

$$\dot{\psi}_t = \frac{V_t}{L_2} \sin(\psi_v - \psi_t - \theta) \quad (3.1)$$

Integrating $\psi_t$ with respect to time t results in the following analytic form:

$$\psi_t(t) = \psi_v - \theta - 2\tan^{-1}\left(\frac{\tan\left(\frac{\psi_v - \psi_{t,0} - \theta}{2}\right)}{e^{\frac{V_t t}{L_2}}}\right) \quad (3.2)$$

where $\psi_{t,0}$ is the initial trailer heading. Equation 3.2 provides an analytic representation of trailer heading over time. A derivation of Equation 3.2 is described below. The analytic solution assumes that basic vehicle information is available (V, $\delta_S$ and $\psi_v$), which can be used to determine the subsequent trailer heading after a given period of time.

From equation 3.2, the position and speed of implement 104 relative to vehicle 100 is predicted through Equations 2.6 and 2.7. Over time, the predicted implement heading converges onto the true implement heading, even from an initial unknown position. One advantage of the virtual implement scheme is no additional sensor hardware is needed on implement 104 and is suitable for operating on flat terrain with few disturbances.

The virtual implement scheme of FIG. 8 also provides a level of redundancy for the measured implement scheme of FIG. 7. For example, implement navigation data from implement sensors 152A and 152B in FIG. 7 may become unavailable. Guidance system 120 may still perform single-mode implement steering by switching over to the virtual implement scheme described in FIG. 8.

The virtual implement scheme also may validate the accuracy of the measured implement data obtained from implement sensors 152A and 152B. For example, if the measured implement data from sensors 152A and 152B starts diverging from predicted implement measurements, guidance system 120 may generate a warning signal or execute a test operation to detect possible corruption of the measured implement data.

Figure 9:
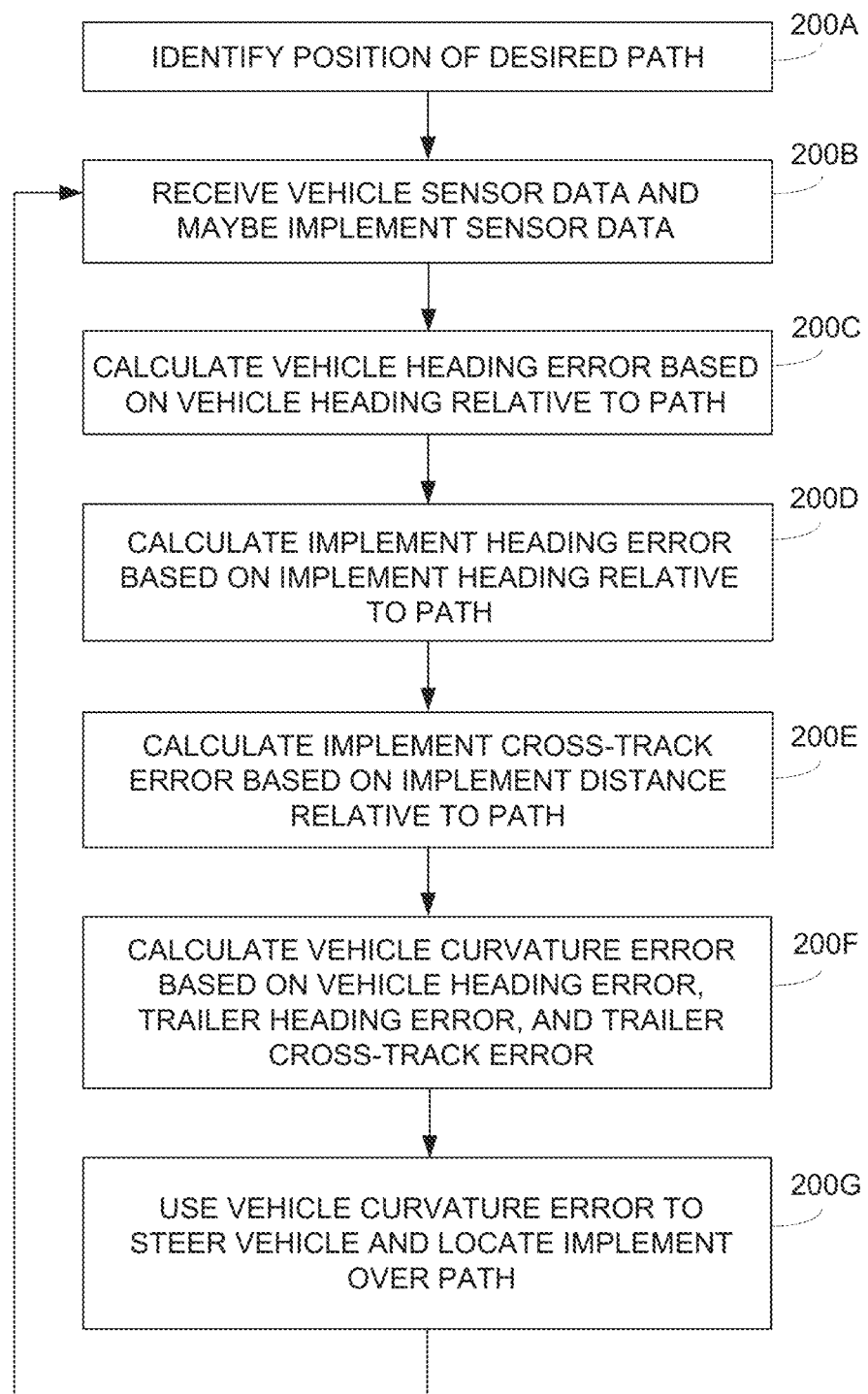
FIG. 9 shows an example process for passive closed-loop single-mode implement steering.

FIG. 9 shows one example single-mode implement steering process. In operation 200A, the guidance system identifies the position of the desired path. For example, a user may enter way lines into an electronic map displayed on a user interface attached to the guidance system.

In operation 200B, the guidance system may receive vehicle sensor data and possibly implement sensor data. For example, the guidance system may receive location, speed, heading, pitch, roll, yaw, or any other vehicle navigation data described above from GPS and/or inertial sensors located on the vehicle. The guidance system also may receive similar location, speed, heading, pitch, roll, yaw, etc. from GPS and/or inertial sensors located on the implement. In an alternative example described above, the implement may not include sensors, and the guidance system may predict the position and heading of the implement.

In operation 200C, the guidance system calculates a vehicle heading error based on a vehicle heading relative to the target path. For example, the guidance system uses the vehicle navigation data to calculate a heading of the vehicle and derives the vehicle heading error by calculating the difference between the vehicle heading and the path direction.

In operation 200D, the guidance system calculates an implement heading error based on a heading of the implement relative to the path. For example, the guidance system uses the implement navigation data, if any, to calculate a heading of the implement and then derives the implement heading error by calculating the difference between the implement heading and the path direction. As explained above, if the implement does not include navigation sensors, the guidance system may calculate the implement heading error based on a predicted implement heading.

In operation 200E, the guidance system calculates the implement cross-track error based on a distance of the implement from the path. For example, the guidance system uses the implement navigation data, if any, to calculate a location of the implement and then derives the implement cross-track error by calculating a distance of the implement location from the path location. As explained above, if the implement does not include navigation sensors, the guidance system may calculate the implement cross-track error based on a predicted implement location.

In operation 200F, the guidance system calculates a vehicle curvature error based on the vehicle heading error, trailer heading error, and trailer cross-track error. For example, the guidance system may calculate the demanded vehicle curvature error using equation 2.37. As mentioned above, instead of initially reducing the position offset of the vehicle, the guidance system immediately starts steering the vehicle to reduce a positional offset of the implement cross-track error relative to path 110.

In operation 200G, the guidance system generates steering commands based on the calculated vehicle curvature error and sends the steering commands to a steering controller. The steering commands provide single-mode vehicle steering so the implement first aligns over the desired path before the vehicle. In one example, the steering commands may cause the vehicle to overshoot the path while aligning the implement with the path. The steering commands then may cause the vehicle to turn back and align over the path. In another example, the path may be curved or the field may be contoured and the guidance system may keep the vehicle at an offset from the target path while the implement remains aligned over the path.

Reverse Single-Mode Implement Steering

When driven manually, the forward motion of a vehicle/trailer system is stable, with the implement naturally and predictably converging behind the vehicle over time. When driven in reverse however, the vehicle/trailer system is inherently unstable, where small disturbances in position may potentially lead to unpredictable trailer movements and run the risk of collision and jackknifing. Steering a vehicle/trailer system in reverse can also be counter-intuitive for an inexperienced driver, with opposite control needed to steer the trailer in the correct direction.

Figure 10:
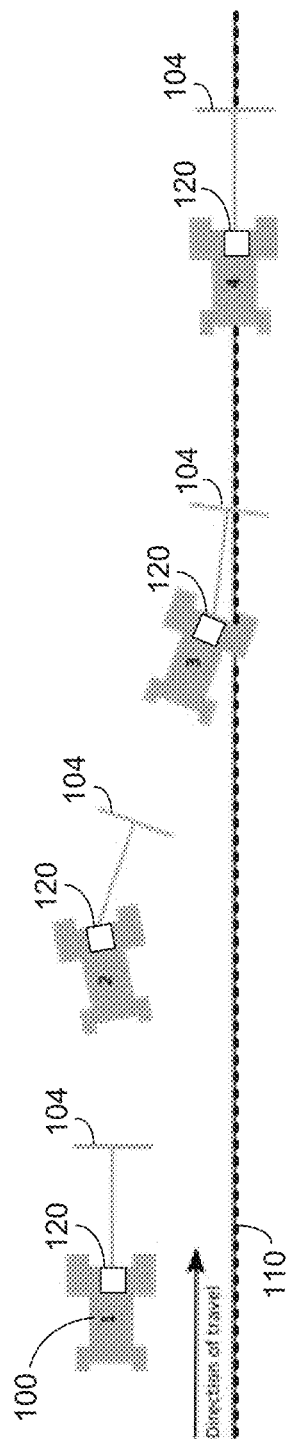
FIG. 10 shows how single-mode implement steering may steer a vehicle in a reverse direction.

FIG. 10 shows how the guidance system performs reverse single-mode implement steering. By using the implement states as part of the vehicle/trailer model as described above in Equation 2.37, guidance system 120 may perform single-mode implement steering while vehicle 100 moves in reverse.

Initially vehicle 100 is offset from desired path 110 in stage 1. When guidance system 120 is engaged, vehicle 100 first steers away from path 110 in order to force implement 104 towards path 110 in stage 2. This maneuver highlights the counter-intuitiveness of steering a vehicle/trailer system in reverse, as opposite steering control is required to achieve the desired implement course change. As vehicle 100 nears path 110, vehicle 100 straightens to place implement 104 on-line in stage 3, with both vehicle 100 and implement 104 on-line at stage 4.

Conventional automated steering usually only steers based on vehicle location and the initial vehicle maneuver at stage 2 would normally be directly towards path 110. This rearward movement toward path 110 would cause implement 104 to head away from path 110 and ultimately jackknife. Guidance system 120 avoids these undesired situations by incorporating implement heading and position states into the steering control model describe above.

Virtual Implement Integral Evaluation

The following equations explain how the position and heading of the implement may be predicted. Defining implement heading rate is as follows:

$$\dot{\psi}_t = \frac{d\psi_t}{dt} = \frac{V_t}{L_2}\sin(\psi - \psi_t - \theta) \quad (A.1)$$

$$\int \frac{d\psi_t}{\sin(\psi - \psi_t - \theta)} = \frac{V_t}{L_2}\int dt \quad (A.2)$$

Using a standard integral solution for an integral in the form:

$$\int \frac{dx}{\sin(\alpha - x)} = \ln\left(\cot\left(\frac{\alpha - x}{2}\right)\right) \quad (A.3)$$

gives $$\ln\left(\cot\left(\frac{\psi - \psi_t - \theta}{2}\right)\right) = \frac{V_t}{L_2}t + C \quad (A.4)$$

When $t=0$, $\psi_t=\psi_{t,0}$, therefore:

$$\ln\left(\cot\left(\frac{\psi - \psi_t - \theta}{2}\right)\right) = \frac{V_t}{L_2}t + \ln\left(\cot\left(\frac{\psi - \psi_{t,0} - \theta}{2}\right)\right) \quad (A.5)$$

$$\ln\left(\cot\left(\frac{\psi - \psi_t - \theta}{2}\right)\right) - \ln\left(\cot\left(\frac{\psi - \psi_{t,0} - \theta}{2}\right)\right) = \frac{V_t}{L_2}t \quad (A.6)$$

$$\ln\left(\frac{\cot\left(\frac{\psi - \psi_t - \theta}{2}\right)}{\cot\left(\frac{\psi - \psi_{t,0} - \theta}{2}\right)}\right) = \frac{V_t}{L_2}t \quad (A.7)$$

Taking the natural logarithm of the LHS and RHS and rearranging the trigonometric component gives:

$$\frac{\tan\left(\frac{\psi - \psi_{t,0} - \theta}{2}\right)}{\tan\left(\frac{\psi - \psi_t - \theta}{2}\right)} = e^{\frac{V_t}{L_2}t} \quad (A.8)$$

And solving for $\psi_t$ gives:

$$\psi_t(t) = \psi - \theta - 2\tan^{-1}\left(\frac{\tan\left(\frac{\psi - \psi_{t,0} - \theta}{2}\right)}{e^{\frac{V_t t}{L_2}}}\right) \quad (A.9)$$

Examples of systems, apparatus, computer-readable storage media, and methods are provided solely to add context and aid in the understanding of the disclosed implementations. It will thus be apparent to one skilled in the art that the disclosed implementations may be practiced without some or all of the specific details provided. In other instances, certain process or methods also referred to herein as "blocks," have not been described in detail in order to avoid unnecessarily obscuring the disclosed implementations. Other implementations and applications also are possible, and as such, the following examples should not be taken as definitive or limiting either in scope or setting.

References have been made to accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described are not necessarily performed in the order indicated in some other implementations. Additionally, in other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

A Global navigation satellite system (GNSS) is broadly defined to include GPS (U.S.) Galileo (European Union, proposed) GLONASS (Russia), Beidou (China) Compass (China, proposed) IRNSS (India, proposed), QZSS (Japan, proposed) and other current and future positioning technology using signal from satellites, with or with augmentation from terrestrial sources.

Inertial navigation systems (INS) may include gyroscopic (gyro) sensors, accelerometers and similar technologies for providing outputs corresponding to the inertial of moving components in all axes, i.e., through six degrees of freedom (positive and negative directions along transverse X, longitudinal Y and vertical Z axes). Yaw, pitch and roll refer to moving component rotation about the Z, X, and Y axes respectively. Said terminology will include the words specifically mentioned, derivative thereof and words of similar meaning.

Figure 11:
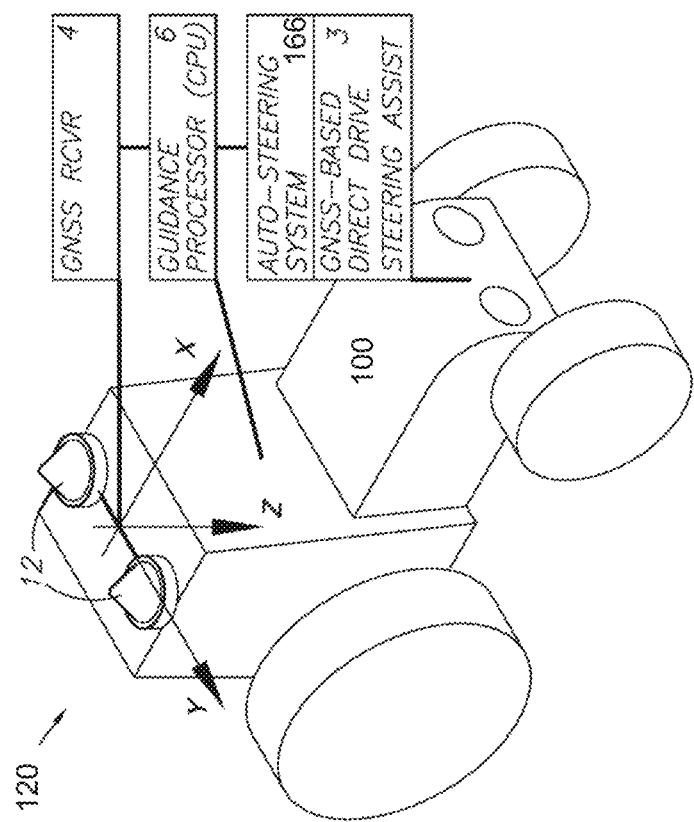
FIG. 11 shows an example guidance system for performing single-mode implement steering.

FIG. 11 generally shows guidance system 120 used in conjunction with an electrical direct-drive steering assistance mechanism 3. Without limitation on the generality of useful applications of guidance system 120, a GNSS receiver 4 and a guidance processor 6 are connected to a GNSS antenna 12 and installed into vehicle 100, such as an agricultural vehicle or tractor. An auto-steering system 166 is electrically connected to guidance processor 6, and is mechanically interfaced with vehicle 100 via steering assistance mechanism 3.

Figure 12:
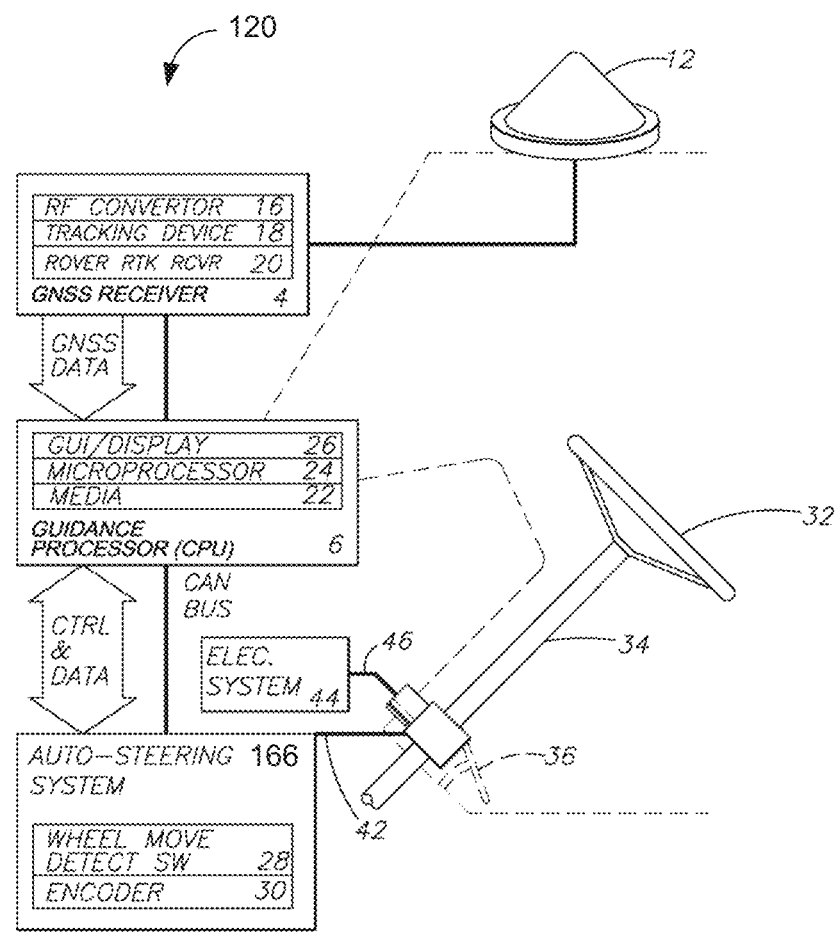
FIG. 12 shows the guidance system of FIG. 11 controlling an auto-steering system.

FIG. 12 shows an additional detail of guidance system 120. The GNSS receiver 4 is further comprised of an RF convertor (i.e., downconvertor) 16, a tracking device 18, and a rover RTK receiver element 20. The receiver electrically communicates with, and provides GNSS positioning data to, guidance processor 6. Guidance processor 6 includes a graphical user interface (GUI) 26, a microprocessor 24, and a media element 22, such as a memory storage drive. Guidance processor 6 electrically communicates with, and provides control data to auto-steering system 166. An auto-steering system 166 includes a wheel movement detection switch 28 and an encoder 30 for interpreting guidance and steering commands from CPU 6.

Auto-steering system 166 may interface mechanically with the vehicle's steering column 34, which is mechanically attached to steering wheel 32. A control line 42 may transmit guidance data from the CPU 6 to the auto-steering system 166. An electrical subsystem 44, which powers the electrical needs of vehicle 100, may interface directly with auto-steering system 166 through a power cable 46. The auto-steering subsystem 166 can be mounted to steering column 34 near the floor of the vehicle, and in proximity to the vehicle's control pedals 36. Alternatively, auto-steering system 166 can be mounted at other locations along steering column 34.

The auto-steering system 166 physically drives and steers vehicle 100 by actively turning the steering wheel 32 via steering column 34. A motor 45 powered by vehicle electrical subsystem 44 may power a worm drive 50 which powers worm gear 48 affixed to auto-steering system 166. These components are preferably enclosed in an enclosure 51. In other embodiments, auto-steering system 166 is integrated directly into the vehicle drive control system independently of steering column 34.

Some of the operations described above may be implemented in software and other operations may be implemented in hardware. One or more of the operations, processes, or methods described herein may be performed by an apparatus, device, or system similar to those as described herein and with reference to the illustrated figures.

"Computer-readable storage medium" (or alternatively, "machine-readable storage medium") used in guidance system 120 may include any type of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Having described and illustrated the principles of a preferred embodiment, it should be apparent that the embodiments may be modified in arrangement and detail without departing from such principles. Claim is made to all modifications and variation coming within the spirit and scope of the following claims.

What is claimed is:

1. A guidance system comprising:
a processor; and
memory coupled to the processor and storing instructions that, when executed by the processor, cause the guidance system to:
calculate a vehicle heading error based on a heading of the vehicle relative to a path;
calculate a trailer heading error for a trailer attached to the vehicle based on a heading of the trailer relative to the path;
calculate a trailer cross-track error based on a distance of the trailer from the path;
calculate a vehicle curvature error based on the vehicle heading error, trailer heading error, and trailer cross-track error; and
use the vehicle curvature error to steer the vehicle and move the trailer toward the path, wherein:

$$e_{K_v} = [K_1 K_2 K_3] \begin{bmatrix} e_{\psi_v} \\ e_{\psi_t} \\ e_{ct_t} \end{bmatrix} + K_{int} \int e_{ct_t} dt,$$

$e_{K_v}$ is the vehicle curvature error,
$e_{\psi_v}$ is the vehicle heading error,
$e_{\psi_t}$ is the trailer heading error,
$e_{ct_t}$ is the trailer cross-track error,
$K_1$, $K_2$, and $K_3$ are gain values for a steering controller, and
$K_{int}$ is an integral term that acts to minimize the trailer cross-track error.

2. A non-transitory computer-readable medium storing instructions that, when executed by a processor, are operable to cause a guidance system to:
calculate a vehicle heading error based on a heading of the vehicle relative to a path;
calculate a trailer heading error for a trailer attached to the vehicle based on a heading of the trailer relative to the path;
calculate a trailer cross-track error based on a distance of the trailer from the path;
calculate a vehicle curvature error based on the vehicle heading error, trailer heading error, and trailer cross-track error; and
use the vehicle curvature error to steer the vehicle and move the trailer toward the path, wherein:

$$e_{K_v} = [K_1 K_2 K_3] \begin{bmatrix} e_{\psi_v} \\ e_{\psi_t} \\ e_{ct_t} \end{bmatrix} + K_{int} \int e_{ct_t} dt,$$

$e_{K_v}$ is the vehicle curvature error,
$e_{\psi_v}$ is the vehicle heading error, $e_{\psi_t}$ is the trailer heading error,
$e_{ct_t}$ is the trailer cross-track error,
$K_1$, $K_2$, and $K_3$ are gain values for a steering controller, and
$K_{int}$ is an integral term that acts to minimize the trailer cross-track error.

3. The non-transitory computer-readable medium of claim 2, wherein:

$$K_1 = \frac{2\zeta\omega_h + \omega_l - \frac{V}{L_2} + \frac{cVK_2}{L_2}}{V},$$

$$K_2 = \frac{\omega_h^2 + 2\zeta\omega_h\omega_l + \frac{c\omega_h^2\omega_l}{V} - \frac{V}{L_2}\left(2\zeta\omega_h + \omega_l - \frac{V}{L_2}\right)}{\frac{V^2}{L_2}\left(1 + \frac{c}{L_2}\right)},$$

$$K_3 = \frac{L_2\omega_h^2\omega_l}{V^3},$$

$\omega h$ and $\omega l$ define desired high and low frequencies pole locations,
$\zeta$ defines a damping factor,
L2 is a length of the trailer,
c is a hitch length of the vehicle behind a control point, and
V is a speed of the vehicle.

4. The non-transitory computer-readable medium of claim 2, wherein the instructions are further operable to:
identify an articulation angle between the vehicle and the trailer;
identify an articulation range limit; and
adjust the vehicle curvature error to maintain the articulation angle within the articulation range limit.

5. The non-transitory computer-readable medium of claim 2, wherein the instructions are further operable to:
predict the trailer heading error and the trailer cross-track error based on a speed of the vehicle, a steering angle of the vehicle, and a heading of the vehicle; and
calculate the vehicle curvature error based on the predicted trailer heading error and the predicted trailer cross-track error.

6. The non-transitory computer-readable medium of claim 2, wherein the instructions are further operable to:
measure the trailer heading error and cross-track error based on readings from a global positioning system (GPS) receiver and inertial sensor located on the trailer;
compare the predicted trailer heading error and cross-track error with the measured trailer heading error and cross-track error; and
generate a notification when a divergence is detected between the predicted trailer heading error and cross-track error and the measured trailer heading error and cross-track error.

7. The non-transitory computer-readable medium of claim 2, wherein the instructions are further operable to calculate the vehicle curvature error for the vehicle moving in a reverse direction that pushes the trailer into alignment with the path.

8. The non-transitory computer-readable medium of claim 2, wherein the instructions are further operable to:
cause the vehicle to overshoot the path and first align the trailer with the path;
cause the vehicle to steer back onto the path to align the vehicle with the path; and
cause the vehicle to continue moving over the path while both the vehicle and trailer remain aligned over the path.

9. A method comprising:
calculating, by a guidance system, a vehicle heading error based on a heading of the vehicle relative to a path;
calculating, by the guidance system, a trailer heading error for a trailer attached to the vehicle based on a heading of the trailer relative to the path;
calculating, by the guidance system, a trailer cross-track error based on a distance of the trailer from the path;
calculating, by the guidance system, a vehicle curvature error based on the vehicle heading error, trailer heading error, and trailer cross-track error; and
using the vehicle curvature error, by the guidance system, to steer the vehicle and move the trailer toward the path, wherein:

$$e_{K_v} = [K_1 K_2 K_3]\begin{bmatrix} e_{\psi_v} \\ e_{\psi_t} \\ e_{ct_t} \end{bmatrix} + K_{int}\int e_{ct_t} dt,$$

$e_{K_v}$ is the vehicle curvature error,
$e_{\psi_v}$ is the vehicle heading error,
$e_{\psi_t}$ is the trailer heading error,
$e_{ct_t}$ is the trailer cross-track error,
$K_1$, $K_2$, and $K_3$ are gain values for a steering controller, and
$K_{int}$ is an integral term that acts to minimize the trailer cross-track error.

* * * * *